United States Patent [19]

Resnick

[11] 3,817,960

[45] June 18, 1974

[54] POLYMERS OF PERFLUOROVINYL ETHERS

[75] Inventor: Paul Raphael Resnick, Wilmington, Del.

[73] Assignee: E. I. de Pont de Nemours and Company, Wilmington, Del.

[22] Filed: Aug. 18, 1972

[21] Appl. No.: 281,987

Related U.S. Application Data

[63] Continuation-in-part of Ser. No. 129,176, March 26, 1971, Pat. No. 3,692,843.

[52] U.S. Cl... 260/87.5 A, 260/91.1 R, 260/615 BF
[51] Int. Cl............................. C08f 15/02, C08f 3/38
[58] Field of Search................... 260/87.5 A, 91.1 R

[56] References Cited
UNITED STATES PATENTS
3,450,684   6/1969   Darby................................ 260/87.5

Primary Examiner—Stanford M. Levin

[57] ABSTRACT

Compounds of the formula $CF_3O(CF_2O)_nCF_2CF_2OCF=CF_2$, wherein n is 1 to 5, are homopolymerizable or copolymerizable with tetrafluoroethylene to make polymer products of varying molecular weight. Low molecular weight homopolymer is useful as thermally stable oils and greases and high molecular weight copolymer is useful for making molded articles.

3 Claims, No Drawings

POLYMERS OF PERFLUOROVINYL ETHERS

This application is a continuation-in-part of U.S. Pat. application Ser. No. 129,176 filed Mar. 26, 1971 now U.S. Pat. No. 3,692,843, issued Sept. 19, 1972.

This invention relates to polymers of fluorocarbon vinyl ethers of the formula $CF_3O(CF_2O)_{1-5}CF_2CF_2OCH=CH_2$.

Fluorocarbon vinyl ethers of the formula $R-O-CF=CF_2$, wherein R is a perfluoroalkyl group, are disclosed in U.S. Pat. No. 3,132,123 to Harris et al. Fluorocarbon vinyl ethers of the formula $RCF_2-O-CF=CF_2$, wherein R has the same meaning as above, are disclosed in U.S. Pat. No. 3,114,778 to Fritz et al. Additional fluorocarbon vinyl ethers, of the formula $CF_3CF_2(OCF_2CF_2)_nOCF=CF_2$, wherein n is at least 1, are disclosed in U.S. Pat. No. 3,450,684 to Darby. Additional examples of vinyl ethers are disclosed in U.S. Pat. Nos. 3,250,808 and 3,321,532 to Moore et al. and Lorenz, respectively. Polymers of these ethers are also disclosed in these patents.

The present invention provides polymers of a new group of fluorocarbon vinyl ethers, namely, of the formula $CF_3O(CF_2O)_nCF_2CF_2OCF=CF_2$, wherein n is an integer of 1 to 5 inclusive. Thus, the individual vinyl ethers of the group are as follows:

$CF_3OCF_2OCF_2CF_2OCF=CF_2$, $CF_3O(CF_2O)_2CF_2CF_2OCF=CF_2$, $CF_3O(CF_2O)_3CF_2CF_2OCF=CF_2$, $CF_3O(CF_2O)_4CF_2CF_2OCF=CF_2$, $CF_3O(CF_2O)_5CF_2CF_2OCF=CF_2$.

The polymers of the present invention as formed by polymerizing or copolymerizing any of these ethers through the carbon-to-carbon double bond to form polymer having the recurring unit

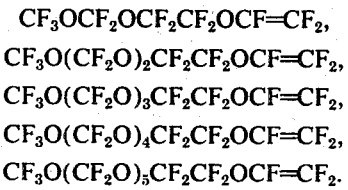

wherein n has the same meaning as above.

The vinyl ether monomers can be prepared by reacting acyl fluorides of the formula $CF_3O(CF_2O)_nCF_2COF$, wherein n has the same meaning as above, with hexafluoropropylene epoxide (oxide) using for example the conditions disclosed in the aforementioned Fritz et al. patent. Briefly, the reaction is carried out with about equimolar quantities of reactants in a polar solvent such as dimethyl ether of ethylene glycol or benzonitrile, containing a fluoride catalyst such as KF or CsF, at a temperature in the range of $-30$ to $100°$ C.

The acyl fluoride starting material can be prepared by the low temperature oxidation of tetrafluoroethylene in the presence of ultra violet radiation as disclosed in British Pat. No. 1,097,679 or by electrochemical fluorination of the hydrocarbon carboxylic acid analog, and the hexafluoropropylene epoxide starting material can be prepared by the alkaline hydrogen peroxide oxidation of hexafluoropropylene as disclosed in U.S. Pat. No. 3,358,003 to Eleuterio et al. or by the oxidation processes disclosed in Canadian Pat. Nos. 691,974 and 832,469.

The product of the reaction between the acyl fluoride and hexafluoropropylene epoxide is a compound of the formula $CF_3(CF_2O)_nCF_2CF_2OCF(CF_3)COF$, wherein n has the same identity as the starting acyl fluoride. This product can be converted to the corresponding vinyl ether monomer by the pyrolysis process disclosed in the aforementioned Fritz et al. patent. Briefly, the pyrolysis can be conducted by passing the reaction product in gaseous form through a reaction zone maintained at an elevated temperature of from $300°$ to $600°$ C., wherein the reaction product contacts an alkali metal compound, followed by removing the compound of this invention as a gaseous effluent from the reaction zone. A preferred gaseous pyrolysis procedure is disclosed in U.S. Pat. No. 3,291,843 to Fritz and Selman in which the pyrolysis temperature is from $200°$ to $300°$ C. and the alkali metal compound is $Na_2CO_3$. Alternatively, the liquid phase pyrolysis procedure described in the Fritz and Selman patent can be used, wherein the epoxide-acyl fluoride reaction product and alkali metal compound such as $Na_2CO_3$ are contained in a polar organic liquid such as a dialkyl ether of ethylene glycol. The sodium salt of the reaction product can be formed by room temperature stirring, and this is followed by heating typically at temperature of from $75°$ to $160°$ C. to form the desired vinyl ether.

The resultant fluorocarbon vinyl ethers, $CF_3O(CF_2O)_{1-5}CF_2CF_2OCF=CF_2$, are liquids having a boiling point in excess of $60°$ C. at standard temperature and pressure.

These fluorocarbon vinyl ethers can be polymerized to form thermally stable oils and greases which are useful as such in high temperature lubrication applications. Typically, the polymer will withstand prolonged exposure at temperatures in excess of $150°$ C. and even in excess of $200°$ C. without degradation.

The polymerization can be carried out by conventional procedures involving for example exposing a solution of the vinyl ether or the vinyl ether in bulk to a source of free radicals generated by irradiation of the solution or by free-radical initiator added to the solution. The resultant polymer contains recurring units of the formula

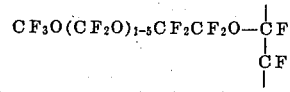

A preferred group of polymers of the present invention is the copolymers of the vinyl ether (same recurring unit) with tetrafluoroethylene prepared by free-radical polymerization. In this preferred group ether concentrations of 0.01 to 5% by weight appears to be the most useful, the smaller amounts, i.e. less than 0.5 to 1% by weight improving the properties of PTFE homopolymer while still retaining its high stability and non-melt-fabricable character. Greater than 0.5 to 1% by weight tends to make the copolymer melt fabricable. The precise amount of vinyl ether required to alter the fabricability character of the copolymer at given polymerization conditions will depend on the molecular weight of the vinyl ether.

The preparation of the vinyl ether monomers and of polymers of the present invention is further illustrated by the following examples in which parts and percents are by weight unless otherwise indicated:

EXAMPLE 1

Preparation of

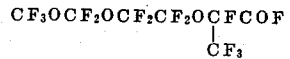

(perfluoro-2-methyl-3,6,8-trioxanonanoyl fluoride).

A 500 ml three-necked, round bottom flask was charged with 5 g cesium fluoride, 75 ml diethylene glycol dimethyl ether, and 54 g of a mixture of 87% perfluoro-3,5-dioxahexanoyl fluoride and 13% 1,1,2-trichloro-1,2,2-trifluoroethane. After stirring for 30 minutes, 25 g of hexafluoropropylene oxide was added, causing an exothermic reaction which increased the temperature of the reaction mixture from 15° to 35° C. The reaction mixture was then cooled, the lower layer separated and distilled to give 33.3 g of perfluoro-2-methyl-3,6,8-trioxanananoyl fluoride boiling at 88°–89° C. The infrared spectrum of this material, which showed a band due to —COF at 5.31 microns, was consistent with this structure. A small portion of the acyl fluoride was converted to the corresponding methyl ester upon treatment with methanol. The mass spectrum and NMR spectrum of the product, b.p. 134° C., was consistent with the methyl perfluoro-2-methyl-3,6,8-trioxanonanoate structure. Elemental analysis showed carbon 22.50%; hydrogen 0.71%.

Preparation of $CF_3OCF_2OCF_2CF_2OCF=CF_2$
(perfluoro-3,5-dioxahexylvinyl ether)

A 300 ml three-necked, round bottom flask was charged with 16.9 g of anhydrous sodium carbonate and 75 ml of anhydrous diethylene glycol dimethyl ether. To the stirred reaction mixture was added 33.3 g of perfluoro-2-methyl-3,6,8-trioxanonanoyl fluoride. The reaction mixture was stirred for one hour at room temperature and then heated to about 120° C. to give a distillate, boiling point 66° C. (the distillate is primarily the desired vinyl ether which distills off as it is formed from the sodium salt). The distillate was washed with water and dried with anhydrous sodium sulfate to give 23.8 g (85.3%) of perfluoro-3,5-dioxahexylvinyl ether. The infrared spectrum of this material, which showed a band due to the $CF_2=CF-O$ group at 5.45 microns, was consistent with this structure. The vinyl ether was brominated to give perfluoro-3,5-dioxahexyl-1,2-dibromoethyl ether, b.p. 134° C., whose structure was confirmed by NMR and IR spectroscopy.

EXAMPLE 2

Preparation of

(perfluoro-2-methyl-3,6,8,10,12-pentaoxatridecanoyl fluoride)

A 500 ml three-necked, round bottom flask was charged with 5 g cesium fluoride, 75 ml. diethylene glycol dimethyl ether and 70.5 g of perfluoro-3,5,7,9-tetraoxadecanoyl fluoride. The reaction mixture was stirred and 29 g of hexafluoropropylene oxide added at 30 ± 2°. The reaction mixture was stirred for about 30 minutes and the lower layer separated and distilled to give 45.1 g (47.5%) of perfluoro-2-methyl-3,6,8,10,12-pentaoxatridecanoyl fluoride, b.p. 132°–3° C. The infrared spectrum of this material was consistent with this structure.

Preparation of $CF_3OCF_2OCF_2OCF_2OCF_2CF_2OCF=CF_2$
(perfluoro-3,5,7,9-tetraoxadecylvinyl ether)

A 300 ml three-necked, round bottom flask was charged with 17.5 g of anhydrous sodium carbonate and 75 ml of anhydrous diethylene glycol dimethyl ether. To the stirred reaction mixture was added 45.1 g of perfluoro-2-methyl-3,6,8,10,12-pentaoxatridecanoyl fluoride. The reaction mixture was stirred for 16 hours at room temperature and then heated (to about 120° C) to give a distillate, b.p. 107°. The distillate was washed with water, dried with calcium chloride and redistilled to give pure perfluoro-3,5,7,9-tetraoxadecylvinyl ether, b.p. 107° C. The I.R., NMR and mass spectra were consistent with this structure. Bromination yielded the corresponding dibromide, perfluoro-3,5,7,9-tetraoxadecyl-1,2-dibromoethyl ether, whose structure was confirmed by I.R. and NMR spectroscopy.

EXAMPLE 3

Preparation of

(perfluoro-2-methyl-3,6,8,10,12,14-hexaoxapentadecanoyl fluoride)

To a 500 ml three-necked, round bottom flask was charged with 4 g cesium fluoride, 150 ml diethylene glycol dimethyl ether, 31.5 g of perfluoro-3,5,7,9,11-pentaoxadodecanoyl fluoride, and 12.0 g of hexafluoropropylene oxide. The reaction medium was stirred for 1 hour during which time an exothermic reaction took place, raising the temperature of the medium to 39° C. The lower layer of the medium was recovered and it contained 26.4 g of perfluoro-2-methyl-3,6,8,10,12,14-hexaoxapentadecanoyl fluoride.

Preparation of $CF_3OCF_2OCF_2OCF_2OCF_2CF_2OCF=CF_2$
(perfluoro-3,5,7,9,11-pentaoxadodecylvinyl ether)

A 300 ml three-necked, round bottom flask was charged with 10.6 g anhydrous sodium carbonate and 100 ml diethylene glycol dimethyl ether. To the stirred reaction mixture was added 26.4 g perfluoro-2-methyl-3,6,8,10,12,14-hexaoxapentadecanoyl fluoride. The reaction mixture was stirred at room temperature for 16 hours and then heated to about 120° C. to give a colorless distillate containing two layers. This was washed with water and 5% sodium bicarbonate solution and dried to give 16.9 g of crude product. Distillation gave 4.6 g of a center cut, b.p. 112° C., identified as perfluoro-3,5,7,9,11-pentaoxadodecylvinyl ether. The I.R. spectrum of this material was consistent with this structure. Bromination yielded the corresponding dibromide perfluoro-3,5,7,9,11-pentaoxadodecyl-1,2-dibromoethyl ether, whose structure was confirmed by NMR spectoroscopy.

EXAMPLE 4

Polymerization of $CF_3OCF_2OCF_2CF_2OCF=CF_2$
(perfluoro-3,5-dioxahexylvinyl ether)

A sealed 6 mm diameter quartz tube containing 1.165 g of perfluoro-3,5-dioxahexylvinyl ether was irradiated for 329 hours using 8 RUL-2537A lamps (available from The Southern New England Ultraviolet Company). The product was a clear viscous liquid (oil), soluble in Freon C-51-12 (a mixture of perfluorodimethyl cyclobutane isomers with the 1,2-isomer predominating) whose infrared spectrum was consistent with a low molecular weight polymer of perfluoro-3,5-dioxahexyl-vinyl ether.

Similar procedures can be used to polymerize these vinyl ethers to higher molecular weight oils and greases.

EXAMPLE 5

Copolymerization of $CF_3OCF_2OCF_2CF_2OCF=CF_2$ (perfluoro-3,5-dioxahexylvinyl ether) and TFE A 350 ml stainless steel pressure (shaker) tube was charged with 140 ml distilled water, 10 ml 1,1,2-trichloro-1,2,2-trifluoroethane, 4.4 g perfluoro-3,5-dioxahexylvinyl ether, 0.16 g FC95 Fluorad Surfactant, believed to be the potassium salt of perfluorooctane sulfonic acid, a product of the 3M Company, 0.50 g ammonium carbonate and 0.10 g ammonium persulfate. The mixture was heated to 70° and tetrafluoroethylene added to keep the pressure at 315 psia. After 35 minutes the reaction vessel was cooled, the gases discharged and the white polymer removed. The polymer was washed with methanol, acetone and water and dried under vacuum at 90° to constant weight to give 133.1 g of product. The infrared spectrum showed bands at 10.3 and 10.4 microns indicating the presence of a 0.2–0.5% by weight of perfluoro-3,5-dioxahexylvinyl ether in the polymer. A DTA scan showed a mp of 318°, further showing the incorporation of comonomer in the polymer. This copolymer became transparent in the melt rapidly as compared to polytetrafluoroethylene homopolymer, which indicates improved sinterability for the copolymer. The copolymer was subjected to testing by granular PTFE methods and exhibited an excellent combination of properties: tensile strength 5,010 psi, yield point 1,910 psi, utimate elongation 470%, tensile impact strength 660 ft. lb./in², SSG (standard specific gravity) 2.1689 and moldability index of 3.1 (test described in U.S. Pat. application Ser. No. 75,235 filed Sept. 24, 1970, now available as Dutch published Pat. application No. 13186/71 and French Pat. No. 71 34295).

EXAMPLE 6

Copolymerization of $CF_3OCF_2OCF_2CF_2OCF=CF_2$ (perfluoro-3,5-dioxahexylvinyl ether) and TFE A 180 ml stainless steel pressure tube was charged with 100 ml 1,1,2-trichloro-1,2,2-trifluoroethane, 6.0 g perfluoro-3,5-dioxahexylvinyl ether, 25 ml of a solution of 0.001 g perfluoro-n-propionyl peroxide per ml of 1,1,2-trichloro-1,2,2-trifluoroethane and 25 g of tetrafluoroethylene. The reaction mixture was heated to 50° and an exothermic reaction took place raising the temperature to 98°. The reaction was continued at 50° for 1 hour and the product removed. The polymer was precipitated with acetone, filtered, washed with water and dried to give 26.8 g of product. The infrared spectrum indicated a comonomer content of 2.7% by weight of perfluoro-3,5-dioxahexylvinyl ether. A DTA scan showed a mp of 313° further demonstrating the incorporation of comonomer in the polymer.

EXAMPLE 7

Copolymerization of $CF_3OCF_2OCF_2OCF_2OCF_2CF_2OCF=CF_2$ (perfluoro-3,5,7,9-tetraoxadecylvinyl ether) and TFE A 180 ml stainless steel pressure tube was charged with 100 ml 1,1,2-trichloro-1,2,2-trifluoroethane, 6.0 g perfluoro-3,5,7,9-tetraoxadecylvinyl ether, 25 ml of a solution of 0.001 g perfluoro-n-propionyl peroxide per ml of 1,1,2-trichloro-1,2,2-trifluoroethane and 25 g of tetrafluoroethylene. The reaction mixture was heated to 50° and an exothermic reaction took place raising the temperature to 94°. The reaction was continued at 50° for 1 hour and the product removed. The polymer was precipitated with acetone, filtered, washed with water and dried to give 27.5 g of product. The infrared spectrum of the polymer indicated a comonomer content of approximately 1% by weight of perfluoro-3,5,7,9-tetraoxadecylvinyl ether. A DTA scan showed a mp of 317°, further demonstrating the incorporation of comonomer in the polymer.

EXAMPLE 8

Copolymerization of $CF_3OCF_2OCF_2OCF_2OCF_2OCF_2CF_2OCF=CF_2$ (perfluoro-3,5,7,9,11-pentaoxadodecylvinyl ether) and TFE A 180 ml stainless steel pressure tube was charged with 100 ml 1,1,2-trichloro-1,2,2-trifluoroethane, 4.2 g perfluoro-3,5,7,9,11-pentaoxadodecylvinyl ether, 25 ml of a solution of 0.001 g perfluoro-n-propionyl peroxide per ml of 1,1,2-trichloro-1,2,2-trifluoroethane and 20 g of tetrafluoroethylene. The reaction mixture was heated to 50° and an exothermic reaction took place, raising the temperature to 76°. The reaction was continued at 50° for 1 hour and the product removed. The polymer was precipitated with acetone, filtered, washed with water and dried to give 20.7 g of product. The infrared spectrum indicated a comonomer content of greater than 0.5% by weight of perfluoro-3,5,7,9,11-pentaoxadodecylvinyl ether. A DTA scan showed a mp of 319°, further demonstrating the incorporation of comonomer in the polymer.

As many apparently widely different embodiments of this invention may be made without departing from the spirit and scope thereof, it is to be understood that this invention is not limited to the specific embodiments thereof except as defined in the appended claims.

I claim:

1. Homopolymers and tetrafluoroethylene copolymers containing the recurring unit

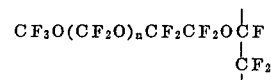

wherein $n$ is an integer of 1 to 5.

2. The polymer of claim 1 as a copolymer with tetrafluoroethylene.

3. The polymer of claim 2 wherein the proportion of said recurring unit is from 0.01 to 5% by weight.